US010451457B2

(12) United States Patent
Mackenzie

(10) Patent No.: US 10,451,457 B2
(45) Date of Patent: Oct. 22, 2019

(54) WATER DELUGE SYSTEM TESTING APPARATUS AND METHOD

(71) Applicant: PARADIGM FLOW SERVICES LIMITED, Banchory (GB)

(72) Inventor: Hugh Mackenzie, Banchory (GB)

(73) Assignee: PARADIGM FLOW SERVICES LIMITED, Banchory (GB)

( * ) Notice: Subject to any disclaimer, the term of this patent is extended or adjusted under 35 U.S.C. 154(b) by 598 days.

(21) Appl. No.: 14/778,717

(22) PCT Filed: Mar. 21, 2014

(86) PCT No.: PCT/GB2014/050896
§ 371 (c)(1),
(2) Date: Sep. 21, 2015

(87) PCT Pub. No.: WO2014/147418
PCT Pub. Date: Sep. 25, 2014

(65) Prior Publication Data
US 2016/0054158 A1 Feb. 25, 2016

(30) Foreign Application Priority Data
Mar. 21, 2013 (GB) .................................. 1305239.4

(51) Int. Cl.
*G01F 1/05* (2006.01)
*A62C 37/50* (2006.01)
(Continued)

(52) U.S. Cl.
CPC ............. *G01F 1/053* (2013.01); *A62C 35/62* (2013.01); *A62C 37/50* (2013.01); *G01L 9/00* (2013.01)

(58) Field of Classification Search
CPC ................. G01F 1/053; A62C 36/62
(Continued)

(56) References Cited

U.S. PATENT DOCUMENTS 5,161,406 A * 11/1992 Heinonen ........... A61M 16/104
73/23.2
5,367,910 A * 11/1994 Woodward ............... G01F 1/34
73/861
(Continued)

FOREIGN PATENT DOCUMENTS

CN 1224486 A 7/1999
DE 10 2010 050505 A1 5/2012
(Continued)

OTHER PUBLICATIONS

Lev et al., "Dry Testing of Water Spray Systems," Journal of Fire Sciences, Lancaster, PA vol. 7, No. 1, pp. 3-21 (Jan. 1, 1989) XP008078154.
(Continued)

*Primary Examiner* — Tarun Sinha
(74) *Attorney, Agent, or Firm* — Saul Ewing Arnstein & Lehr LLP

(57) ABSTRACT

The invention provides a method and apparatus for of performing a test on a deluge system. The method comprises providing a gas source in fluid communication with a deluge system. A plurality of fluid sensors is installed at a plurality of locations (e.g. nozzles) in the deluge system. The gas source is activated to cause gas to flow through the deluge system during a gas test period, and using the plurality of sensors, at least one fluid parameter during the gas test period is measured to provide a gas test data set. The first gas test data set is stored, transmitted and/or processed to derive information about the condition of the deluge system.

30 Claims, 5 Drawing Sheets

(51) Int. Cl.
  *A62C 35/62* (2006.01)
  *G01L 9/00* (2006.01)
(58) Field of Classification Search
  USPC .......................................................... 73/49.5
  See application file for complete search history.

(56) References Cited

U.S. PATENT DOCUMENTS

| | | | | |
|---|---|---|---|---|
| 5,808,541 | A * | 9/1998 | Golden | A62C 37/40 |
| | | | | 169/26 |
| 5,950,150 | A | 9/1999 | Lloyd et al. | |
| 8,814,064 | B2 * | 8/2014 | Oag | B05B 1/12 |
| | | | | 239/480 |
| 2006/0266097 | A1 * | 11/2006 | Eickhoff | G01N 27/4163 |
| | | | | 73/1.06 |
| 2008/0022677 | A1 * | 1/2008 | Barbe | F02B 37/00 |
| | | | | 60/599 |
| 2009/0254315 | A1 * | 10/2009 | Golinveaux | A62C 35/62 |
| | | | | 703/1 |
| 2011/0139264 | A1 | 6/2011 | Kuwatch | |
| 2012/0053861 | A1 * | 3/2012 | Kremer | C10G 75/02 |
| | | | | 702/50 |
| 2014/0048290 | A1 * | 2/2014 | Bodemann | A62C 35/60 |
| | | | | 169/16 |
| 2016/0001113 | A1 * | 1/2016 | Buitenhuis | A62C 37/50 |
| | | | | 73/37 |

FOREIGN PATENT DOCUMENTS

| | | |
|---|---|---|
| EP | 0 209 388 A2 | 1/1987 |
| NL | 2 007 339 C | 3/2013 |
| WO | 03/100555 A2 | 12/2003 |
| WO | 2012/062484 A1 | 5/2012 |

OTHER PUBLICATIONS

Anonymous, "Gas Turbine and Transmitter Systems with ATEX Enclosures," retrieved from the Internet: URL: https://web.archive.org/web/20130314005639/http://www.omega.com/ppt/pptsc.asp?ref=SYS_FTBG-100&Nav=gref02 [retreived on Nov. 7, 2014] Mar. 14, 2013 XP055151571.

International Search Report, dated Jan. 23, 2015, and Written Opinion, issued in priority International Application No. PCT/GB2014/050896.

* cited by examiner

WATER DELUGE SYSTEM TESTING APPARATUS AND METHOD

CROSS REFERENCE TO RELATED APPLICATIONS

This application claims the priority of PCT/GB2014/050896, filed on Mar. 21, 2014, which claims the benefit of priority to Great Britain Application No. 1305239.4, filed on Mar. 21, 2013, the entire contents of which are fully incorporated herein by reference.

The present invention relates to water deluge systems, and in particular to a method and apparatus for performing tests on water deluge systems. The invention has particular application to water deluge systems in offshore installations or vessels such as those used in the hydrocarbon exploration and production industry.

BACKGROUND TO THE INVENTION

Conventional fire sprinkler systems are used widely in factories and commercial properties, and increasingly in homes, as an active fire protection measure. A conventional sprinkler system typically includes a network of sprinkler outlets located overhead a protected area, connected to a water supply. The sprinkler outlets are maintained in a closed position until activated. Activation is usually by way of a heat-sensitive element within one or more sprinklers, which react to an ambient temperature exceeding an activation temperature. Above the activation temperature, the sprinklers are opened and water flows from the water supply on to the protected area.

A water deluge system is designed to extinguish a fire by dispensing a large volume of water over a large hazard area, and is typically used in industrial applications. FIG. 1 is a schematic view of a typical water deluge system according to the prior art. The water deluge system, generally depicted at 10, consists of a dry side 12 and a wet side 13, separated by a deluge valve 11. The dry side 12 has a network of pipes 16 and nozzles 17 which are maintained in an open condition. The dry side 12 contains air at atmospheric pressure. The wet side 13 of the deluge system is connected to a fire main 14 or other supply at a water pressure significantly higher than atmospheric pressure.

The system, generally depicted at 10, is activated automatically by a fire alarm system 18 which controls the deluge valve 11. When the deluge valve is opened, water enters the pipe work on the dry side 12 of the deluge system and is dispensed over the hazard area via the open nozzles 17. The deluge valve 11 stays open until it is activated to close.

Deluge systems find particular application in industrial applications, and are standard in onshore and offshore installations used in the oil and gas exploration and production industry. Water deluge systems perform essential health and safety functions in oil and gas installations, and therefore must be properly maintained by keeping the deluge nozzles and associated pipe work clear of debris, corrosion and blockages to ensure that the system will work effectively when required. A poorly maintained deluge system may be unable to dispense sufficient volume of water to extinguish a fire which may of course lead to risks to life and cause damage to the assets. Many offshore water deluge systems, particularly those on platforms and installations built before the 1990's, are believed to include one or more of internal corrosion, corrosion deposits and/or marine growth, any of which may restrict water flow in the pipe work and/or block nozzles.

A typical testing regime for deluge systems for the offshore oil and gas industry includes a so-called 'wet test' performed regularly to meet the criteria of health and safety industry regulators. A wet test involves activating the deluge system in a test period (for example 30 minutes) and checking the deluge system for blocked or restricted nozzles. This may involve manual inspection of nozzles by operators wearing offshore survival suits, checking that flow through nozzles is as expected. One method involves placing a number of receptacles beneath specific areas of the deluge system to collect dispensed seawater. The receptacles have known opening sizes, and the volume of water collected may be compared with the expected volume for the appropriate size of opening of the receptacle.

Deluge testing also typically uses pressure sensors and pipe network fluid flow analysis software such as the software package marketed by Sunrise Systems Limited under the PIPENET™ brand. The pressure sensors are installed at various locations in the deluge system on the dry side. The software package is configured to model the specific deluge system being tested, and calculate expected fluid pressures at the locations of the sensors. When a wet test is performed, the pressure readings taken are compared with the modelled pressure values, and where discrepancies exist a problem with the flow system can be inferred.

One difficulty with the testing regimes of the prior art is that they rely on wet tests being performed each time that information is required on the condition of the deluge system. Wet tests are particularly inconvenient for the management of a facility, as they rely on large volumes of water being dispensed into operational areas, typically for a test period of around 30 minutes for each region of the facility being tested. There will generally be a requirement to protect or "bag off" sensitive equipment including any electronics which is time-consuming and can be unreliable. Personnel are liable to be exposed to the water flow and therefore must wear protective clothing which may impede their mobility and ability to perform their duties. In any event, the personnel are required to carry out their duties in wet and potentially unsafe conditions. Water exposure from wet tests can also cause corrosion problems in the facility (particularly in offshore environments).

It is therefore desirable to reduce or minimise the number of wet tests performed on a deluge system for an industrial facility. Depending on the health and safety policies which apply, a deluge system deemed to be in good condition may only need to be wet tested relatively infrequently (for example every one to two years). However, where a deluge system has a history of problems or poor test results, a health and safety regulatory body may require regular cleaning and/or wet testing of the deluge system, for example every three months. This increases the inconvenience to the operator of the facility, the expense of running the facility, and the risk to personnel and the integrity of the facility.

Furthermore, frequent wet testing is likely to exacerbate problems in the deluge system, for example by increasing corrosion of the pipe work.

It is therefore an aim and object of the invention in at least one of its aspects to provide a method and apparatus for testing a deluge system which addresses one or more of the drawbacks associated with conventional testing regimes. A further aim of the invention is to provide a method and apparatus which avoids or mitigates the requirement to perform wet testing of deluge systems. An additional aim of the invention is to provide a method and/or apparatus which is applicable to the testing of deluge systems in the offshore and/or oil and gas exploration and production industries. Further aims and objects of the invention will become apparent from reading the following description.

SUMMARY OF THE INVENTION

According to a first aspect of the invention there is provided a method of performing a test on a deluge system, the method comprising:

providing a gas source in fluid communication with a deluge system;

providing a plurality of fluid sensors at a plurality of locations in the deluge system;

activating the gas source to cause gas to flow through the deluge system during a gas test period;

measuring, using the plurality of sensors, at least one fluid parameter during the gas test period to provide a gas test data set;

storing, transmitting and/or processing the gas test data set to derive information about the condition of the deluge system.

The method may comprise measuring flow rate and/or pressure at the plurality of locations in the deluge system. Preferably, both pressure and flow rate are measured.

The method may comprise installing the plurality of sensors at the plurality of locations, which may comprise a subset of nozzles of the deluge system. The method may comprise logging or recording the subset of locations.

The method may comprise removing the sensors and/or gas source from the deluge system for a later, subsequent use.

The method may comprise coupling the gas source to the deluge system.

The test period may be between approximately 5 seconds and 120 seconds, and is preferably between 15 seconds and 60 seconds. In a preferred embodiment the test period is not greater than about 30 seconds.

The gas test period may be a first gas test period at a first time, and the gas test data set may be a first gas test data set. The data set may be stored for subsequent comparison against a further data set acquired at a later time.

Preferably, the first gas test period is when the deluge system is in a known operational condition (the first operational condition). The first operational condition may be when the deluge system is known to be functioning at an acceptable level, and may be subsequent to a successful test process. The successful test process may be a successful wet test of the deluge system. Optionally, the method may comprise performing a wet test of the deluge system prior to the gas test period.

The wet test may comprise:

activating the deluge system to cause liquid to flow through from a fire main through the deluge system;

observing or measuring liquid flow parameters through the deluge system;

assessing the condition of the deluge system in dependence on the observations or measurements of liquid flow parameters.

The method may further comprise determining a pressure and/or flow rate of water the fire main corresponding to the wet test. Where a flow rate is determined, the method may comprise measuring a water pressure in the fire main during the wet test.

The method may comprise determining a flow rate corresponding to the wet test by measuring the flow rate by measuring the flow rate at the same pressure as a water pressure measured during a wet test.

The method may comprise:

closing the deluge valve;

flowing water from the fire main to a discharge conduit;

choking the flow through the discharge conduit until the pressure in the fire main corresponds to the measured water pressure during the wet test;

measuring the flow rate through the discharge conduit.

The method may comprise calibrating the plurality of sensors prior to performance of a gas test. The calibration may comprise controllably discharging a gas through the plurality of sensors from an auxiliary gas source.

The method may comprise wirelessly transmitting measurement data from the fluid sensors to a central receiver.

The gas test period may be a second gas test period at a second time, and the gas test data set may be a second gas test data set. The second gas test data set may be compared with a gas data set acquired at an earlier time.

In one embodiment of the invention, the method comprises:

activating the gas source to cause gas to flow through the deluge system during a first gas test period at a first time;

measuring, using the plurality of sensors, at least one fluid parameter during the first gas test period to provide a first gas test data set;

activating the gas source to cause gas to flow through the deluge system during second gas test period at a later, second time;

measuring, using the plurality of sensors, at least one fluid parameter during the second gas test period to provide a second gas test data set; and comparing the first and second gas test data sets.

Comparing the first and second gas test data sets may comprise inferring a change in condition of the deluge system from the comparison of the first and second gas test data sets. Alternatively, or in addition, the method may comprise inferring that there has been no change in the condition of the deluge system from the comparison of the first and second gas test data sets. The change in condition may be, for example, the build up of scale, debris, or corrosion, or the detection of a blockage or a leak in the deluge system.

It will be appreciated that the first and second gas data sets may be carried out separated in time by days, weeks or months, and the invention is not limited to a method in which both first and second gas tests are necessarily performed by the same party, or using the same equipment. The invention extends to the collection of a single data set, which may be compared with an earlier collected data set or a later collected data set in specific embodiments of the invention.

According to a second aspect of the invention, there is provided a fluid sensor for testing a deluge system the fluid sensor comprising:

a body comprising a throughbore and a connector configured to enable to the sensor to be coupled to a nozzle of a deluge system;

at least one of a flow meter or a pressure gauge disposed in the throughbore;

an electronics module configured to receive a signal from the at least one of the flow meter or pressure gauge, and configured to store and/or transmit data corresponding to the received signals.

Preferably the sensor is configured to be removably coupled to a deluge system, and the connector may comprise a threaded connector.

The flow meter may be a turbine flow meter. Preferably the sensor comprises a flow meter and a pressure gauge.

The sensor may comprise a wireless communication transmitter and/or receiver. The sensor may comprise a battery, which may be rechargeable, and/or may comprise a control module.

The sensor may comprise a connector for electronic interaction with one or more components of the electronics module.

Embodiments of the second aspect of the invention may include one or more features of the first aspect of the invention or its embodiments, or vice versa.

According to a third aspect of the invention, there is provided an apparatus for performing a test on a deluge system, the apparatus comprising:

a gas source configured to be coupled to a deluge system;

a plurality of fluid sensors configured to be coupled to the deluge system at a plurality of locations in the deluge system;

wherein the gas source is operable to cause gas to flow through the deluge system during a gas test period;

and wherein the plurality of sensors is operable to measure at least one fluid parameter during the gas test period to provide a gas test data set.

Preferably the gas source is an accumulator, which may be charged by one or more compressed gas cylinders (which may be air cylinders).

Preferably the gas source is operable to discharge gas into the deluge system for a test period of between approximately 5 seconds and 120 seconds, and is preferably is operable to discharge gas for between 15 seconds and 60 seconds. In a preferred embodiment the test period is not greater than about 30 seconds.

Embodiments of the third aspect of the invention may include one or more features of the first or second aspects of the invention or their embodiments, or vice versa.

According to a fourth aspect of the invention, there is provided a storage and configuration module for a deluge system testing apparatus, the module comprising:

a housing for a plurality of fluid sensors, each configured to be coupled to the deluge system at a plurality of locations in the deluge system;

a plurality of couplings for the plurality of fluid sensors, each coupling operable to facilitate functional interaction with the plurality of fluid sensors;

wherein the module is operable to perform one or more of the following operations:

calibration of the plurality of fluid sensors; charging of a battery of the plurality of fluid sensors; configuration of the plurality of fluid sensors; data transfer to or from the plurality of fluid sensors.

Preferably the module comprises a gas supply for calibrating the plurality of fluid sensors.

The plurality of sensors may comprise sensors according to the third aspect of the invention or its preferred embodiments.

The module may comprise a flowline connecting a gas supply (which may be an air cylinder) to a throughbore of the sensor.

The module may comprise an electrical coupling for charging a battery of a sensor, which may be a conductive or an inductive coupling.

Preferably, the module is operable to calibrate a flow meter and/or a pressure gauge of the sensors.

Embodiments of the fourth aspect of the invention may include one or more features of the first to third aspects of the invention or their embodiments, or vice versa.

According to a fifth aspect of the invention there is provided a method of monitoring a deluge system, the method comprising:

providing a gas source in fluid communication with a deluge system;

providing a plurality of fluid sensors at a plurality of locations in the deluge system;

activating the gas source to cause gas to flow through the deluge system during a first gas test period at a first time;

measuring, using the plurality of sensors, at least one fluid parameter during the first gas test period to provide a first gas test data set;

activating the gas source to cause gas to flow through the deluge system during second gas test period at a later, second time;

measuring, using the plurality of sensors, at least one fluid parameter during the second gas test period to provide a second gas test data set; and comparing the first and second gas test data sets.

Embodiments of the fifth aspect of the invention may include one or more features of the first to fourth aspects of the invention or their embodiments, or vice versa.

According to a sixth aspect of the invention there is provided a method of monitoring a deluge system, the method comprising:

providing a gas source in fluid communication with a deluge system;

providing a plurality of fluid sensors at a plurality of locations in the deluge system;

providing a model of the deluge system using a computer-based modelling system, and calculating expected values at least one fluid parameter at the plurality of locations according to the model;

activating the gas source to cause gas to flow through the deluge system during a first gas test period at a first time;

measuring, using the plurality of sensors, at least one fluid parameter during the first gas test period to provide a first gas test data set;

comparing the calculated expected values of the at least one fluid parameter with the measured values of the at least one fluid parameter.

Embodiments of the sixth aspect of the invention may include one or more features of the first to fifth aspects of the invention or their embodiments, or vice versa.

According to a sixth aspect of the invention there are provided a method substantially as described herein with reference to FIGS. 2 to 6; an apparatus as substantially described herein with reference to FIGS. 2 to 6; a fluid sensor substantially as described herein with reference to FIG. 3; a fluid sensor substantially as described herein with reference to FIG. 6; and a storage and configuration module substantially as described herein with reference to FIGS. 4 and 5.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1:
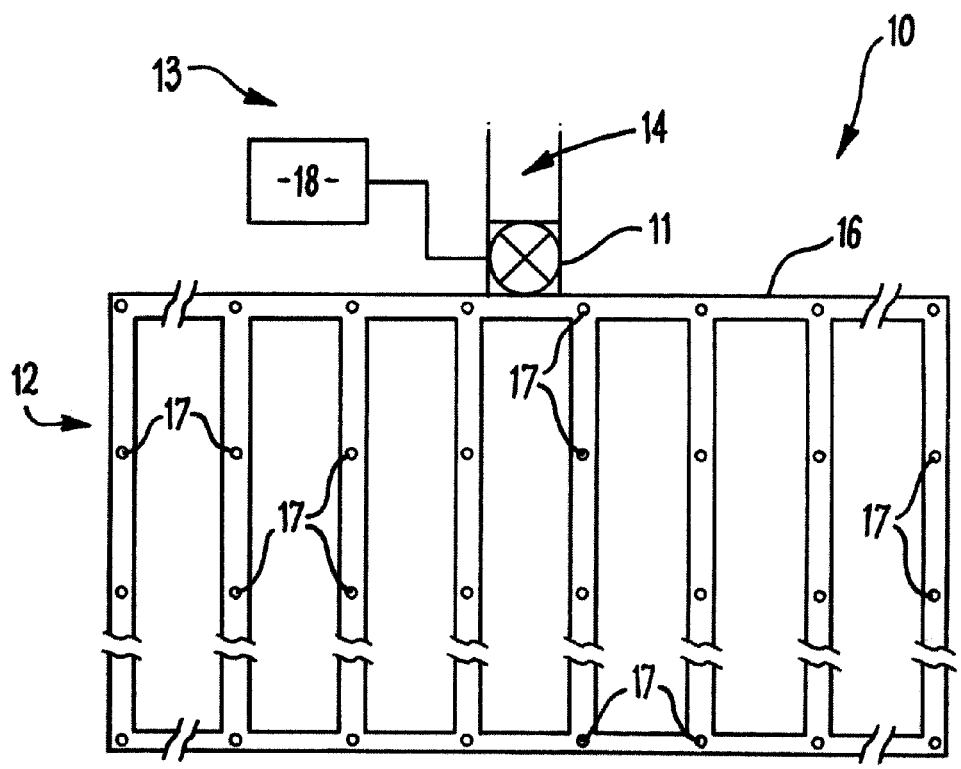
FIG. 1 is a schematic view of a deluge system according to a the prior art.

A noted above, FIG. 1 is a schematic view of a conventional deluge system and is useful for understanding the invention.

Figure 2:
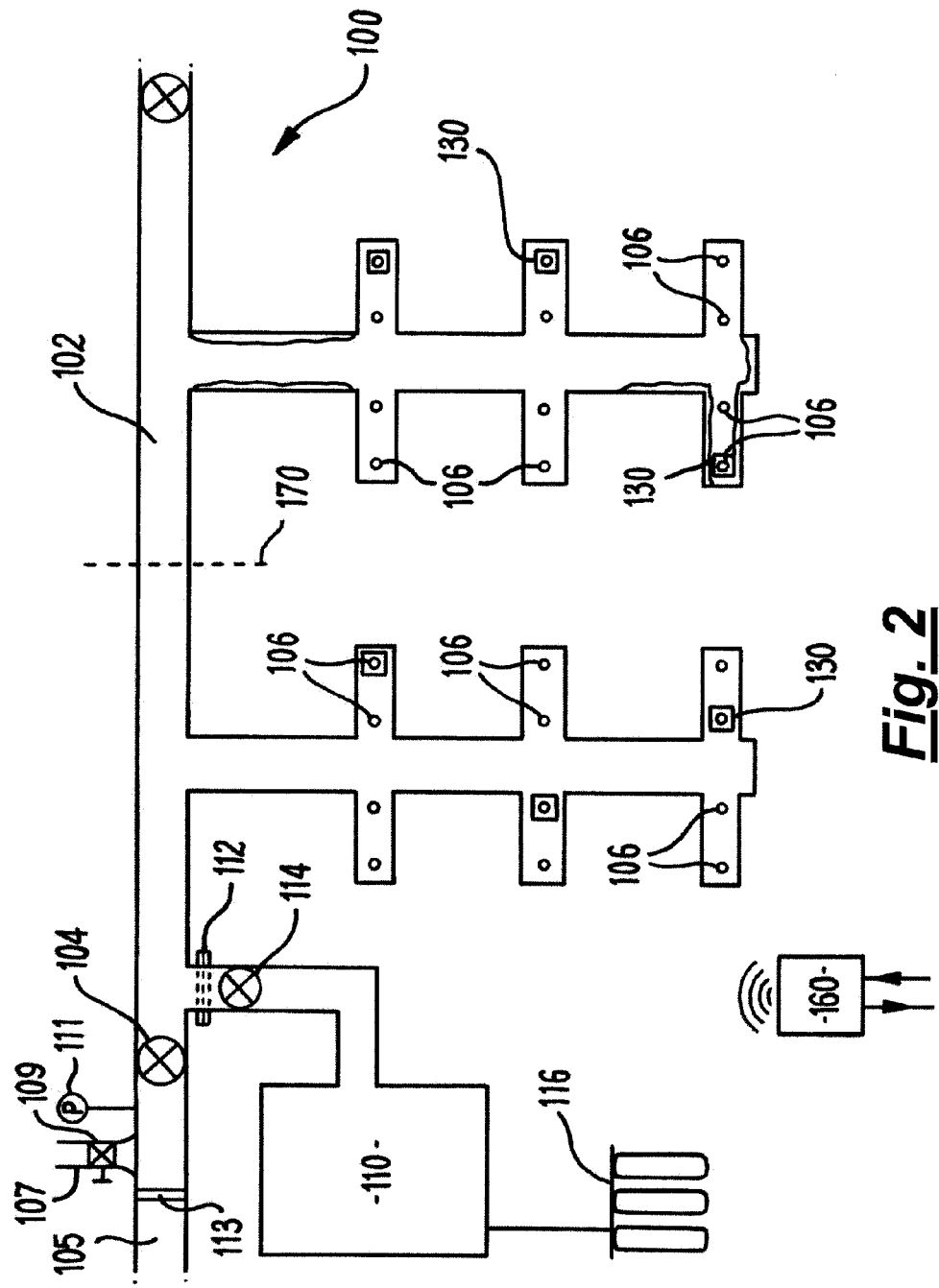
FIG. 2 is a schematic view of an apparatus and deluge system according to a first embodiment of the invention.

Referring now to FIG. 2, there is shown schematically a deluge system 100, in which apparatus according to a first aspect of the invention is installed. The deluge system 100 comprises a network of pipes 102 located on the dry side of the deluge valve 104. The deluge valve 104 connects the dry side to a fire main 105, which has a discharge outlet 107. A pressure gauge 111 and a discharge outlet hose 113 are provided on the fire main 105 side of the deluge valve 104. The pipes 102 are filled with air at atmospheric pressure. The pipes 102 comprise a number of deluge nozzles 106 distributed throughout the pipes 102. Nozzles 106 are open so that when the deluge system 100 is activated by opening the deluge valve 104, water rapidly fills the pipes 102 and discharges through the nozzles.

The apparatus comprises a gas source in the form of an accumulator 110 in fluid communication with the deluge system 102 via a suitable tie-in point 112. A controllable valve 114 is provided in the fluid conduit between the accumulator and the deluge system. The accumulator 110 is charged by a bank of compressed air cylinders 116.

Figure 3:
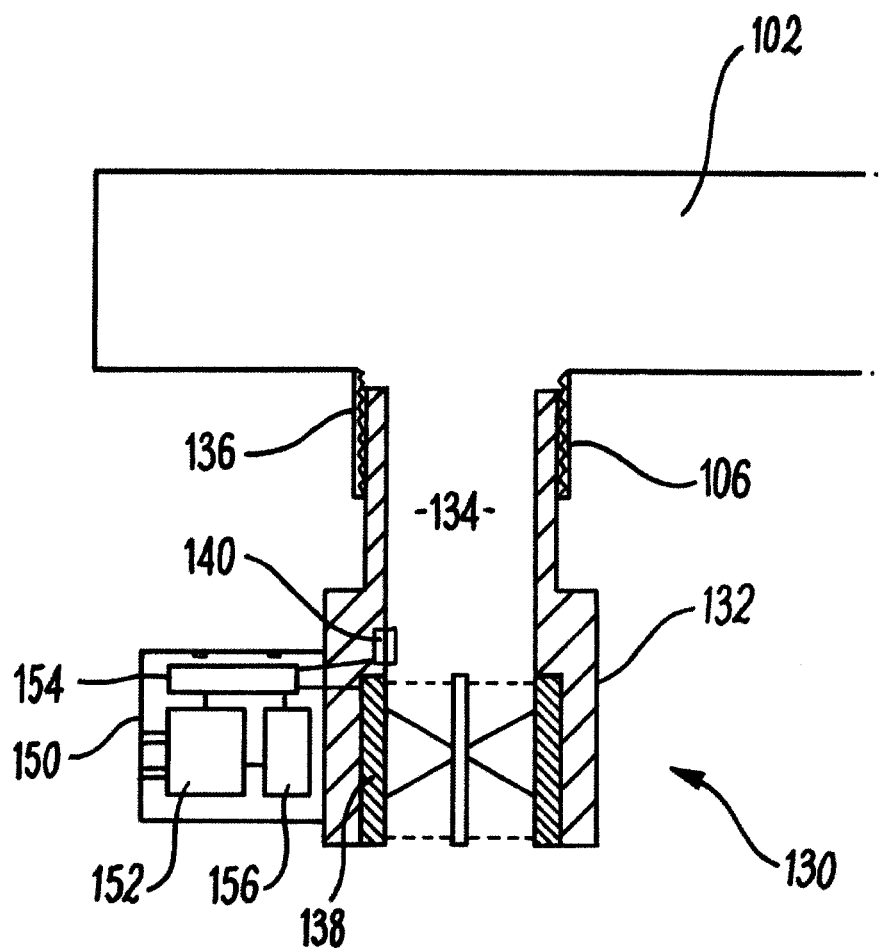
FIG. 3 is a part-sectional view of a fluid sensor of the apparatus of FIG. 2 in situ in a deluge system.

The apparatus also comprises a plurality of sensors 130 installed at a subset of the nozzles 106. FIG. 3 is a part-sectional view of a sensor 130 installed at a nozzle 106 of the deluge system pipe 102. The sensor 130 comprises a substantially cylindrical body 132 defining a throughbore 134. A first end 136 of the body 132 is configured for threaded connection into an existing thread in the nozzle 106. The body 132 accommodates a flow meter 138, which in this embodiment is a turbine flow meter. A suitable turbine flow meter is, for example, a ½ inch (approximately 13 mm) flow meter operating with a measurement output current of around 4 to 20 mA. Such flow meters are available, for example, from Cameron Inc sold under the Barton® brand. The sensor 130 is also provided with a pressure gauge 140 exposed to the throughbore 134. A suitable pressure gauge provides a range of measurements between about 0 and 20 bar (about 0 to 2000 kPa).

The sensor 130 also comprises an electronics module 150. The electronics module comprises a rechargeable battery 152, a control module 154, and a wireless communication transceiver 156. The electronics module is located at one side of the main housing 132 of the sensor 130. The electronics of the sensor 130 have the necessary Zone 2 rating suitable for use in offshore environments.

Figure 4:
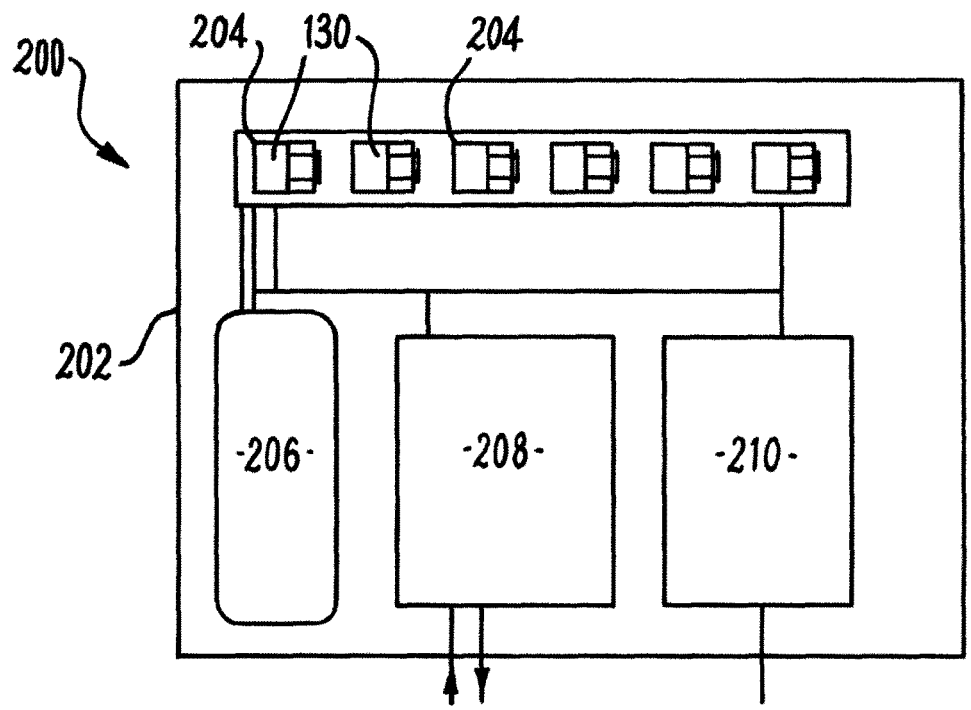
FIG. 4 is a schematic view of the apparatus of FIG. 2 in a storage and configuration module.
Figure 5:
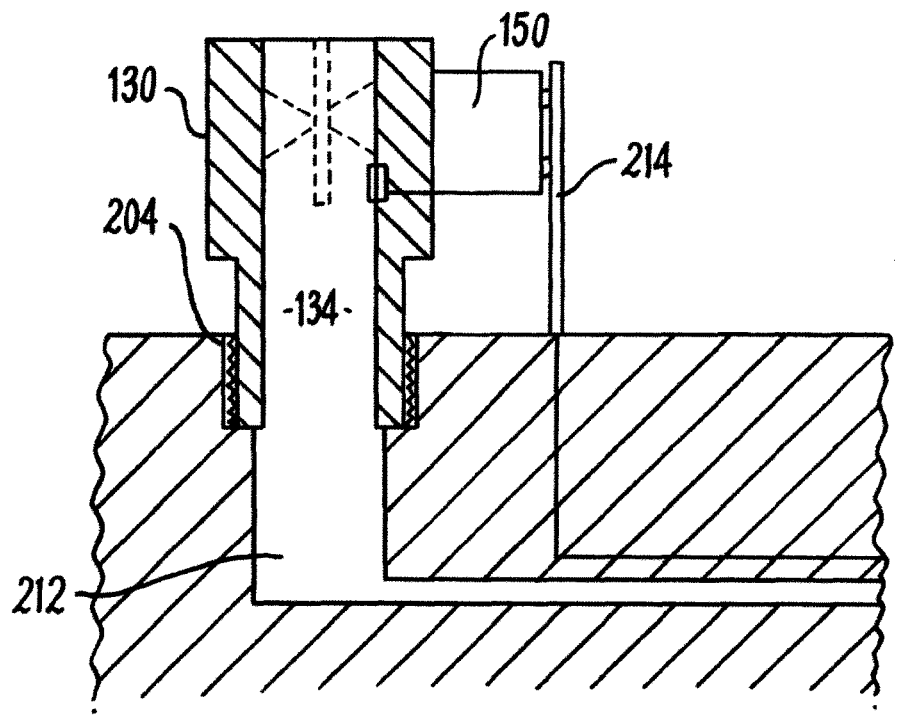
FIG. 5 is a part-sectional view of a fluid sensor of the apparatus of FIG. 4 in situ in storage and configuration module of FIG. 4.

FIGS. 4 and 5 are schematic representations of a storage and configuration module, generally shown at 200, for a plurality of sensors 130. The storage and configuration module 200 comprises a housing in the form of a portable case 202 which protects and stores the internal components, and provides a convenient means for transporting the apparatus to the location at which it is to be used.

The case 202 accommodates an air cylinder 206, a control module 208, and a power supply unit 210. The case 202 accommodates a plurality of mounting recesses 204 for the sensors 130. FIG. 5 shows in sectional view a sensor 130 in a mounting recess 204.

With the sensor 130 located in the mounting recess, as shown in FIG. 5, the throughbore 134 of the sensor 130 is in fluid communication with a flow line 212 linked to the cylinder 206. This allows air to be discharged from the air cylinder 206 during a configuration or calibration step, as will be described in more detail below.

An electrical connector 214 is coupled to the electronics module 150. The electrical connector 214 provides power and/or data transmission between the control module 208 and power supply unit 210 to the electronics module 150. This enables the electronics module 150 to be configured, for data to be transmitted or received, and for the rechargeable battery in the electronics module to be charged when the sensor 130 is being stored.

An example method of use of the apparatus will now be described in the context of testing a deluge system on an offshore oil and gas installation. For the purposes of this example, it will be assumed that the deluge system and/or the fire main to which it is joined have been cleaned and inspected, and are known to be functioning effectively and substantially free of corrosion, debris or blockages. This is a convenient starting point for the method of the invention to be performed. However, it is by no means essential for the method to be performed on a cleaned fire main and/or deluge system.

In this embodiment, a wet test is performed on the deluge system, as it conventional in the art: the deluge valve is opened, and water is allowed to flow from the fire main over a period of 30 minutes, to verify that the deluge system is functioning correctly. A successful wet test provides a benchmark against which future tests in accordance with the invention can be compared.

During the wet test, when steady state flow conditions are reached, a pressure measurement is taken close to the deluge valve 104 on the fire main side of the valve.

In a second phase of operation, the deluge valve 104 is closed, and water is discharged from the fire main 105 via the outlet hose 107 into the sea. The outlet hose 107 comprises an adjustable choke 109 which enables the flow via the outlet hose to be choked until the pressure reading in the fire main is matched to the back pressure of the deluge system as measured during the wet test. The flow rate through the outlet hose is measured using flow meter 113, and provides a flow rate value corresponding to the flow from the fire main during a successful wet test. The flow rate value is recorded or stored for future reference.

The next phase of operation is to perform a gas test (or 'dry test') using the apparatus and configuration shown in FIG. 2. The accumulator is tied into the deluge system via the tie-in point 112 ready for subsequent use. In the meantime, the sensors 130 are located in the storage and configuration module 200. It will be appreciated that although six sensors 130 are described in the embodiment of the invention, any number of sensors may be used in accordance with the principals of the invention. In practice it is likely that a number of sensors greater than six will be used in many deluge applications. The power supply unit 210 of the module 200 has fully charged the batteries of the individual sensors 130 via the electrical connectors 214.

Prior to installation in the deluge system, the sensors 130 are calibrated as follows. The calibration method is controlled by the control module 208 which also provides an interface to an external electronic device such as a personal computer which is operated by a system user (not shown).

The control module enables controlled discharge of air from the air cylinder 206 through each sensor 130 via its respective flow line 212. This controlled discharge of air enables the flow meter 138 and pressure gauge 140 to be calibrated. This is a repeatable process: by calibrating the sensors before each and every use in a dry test, the sensors 130 can be expected to provide consistent results.

After calibration, each sensor 130 is disconnected from the module 200 and installed on a nozzle 106 of the deluge system. It is preferable that the sensors 130 are distributed over a subset of nozzles 106 on the deluge system. The precise locations of the nozzles on which the sensors 130 are installed are recorded by the installation engineer, for example by reference to nozzle numbers or annotation of a schematic diagram or piping and instrumentation diagram (P&ID) This enables subsequent dry tests to be performed using the same nozzle locations, by reinstalling sensors at the same nozzle locations.

With the sensors 130 in place on a subset of the nozzles 106, the dry test is ready to be performed. The accumulator 110 provides a pressurised gas source, and controlled operation of the valve 114 enables discharge of the gas from the accumulator into the deluge system and out through the nozzles. For the best results it is preferred that the accumulator does not bleed down during the test period, and therefore it is desirable for the accumulator to be of a sufficiently high volume and flow rate to allow flow for a suitable test period. This may also be performed by re-filling the accumulator using high pressure gas quads and regulators. A typical test period might be of the order of 30 seconds. During the test period, the individual sensors 130 sample the flow rate of gas and pressure through the throughbore 134. The data is output to the electronics module 150 where it is stored temporarily and transmitted wirelessly to a central receiver 160. The receiver 160 collects flow and pressure data throughout the test period for each of the sensors 130.

The central receiver 160 creates a log of pressure of flow conditions in the deluge system through the period of the test for processing and/or analysis. During analysis, computer software will filter the data so that the measurements collected when the flow of gas is at a steady state are those used in the analysis. The resulting pressure and flow data sets represent the deluge flow conditions at the time the test is carried out (which in this case is when the deluge system is in a known effective functioning condition, shortly after a successful wet test).

At a later time (which may be a period of weeks, months or years), a further dry test can be performed to generate a second data set. In a subsequent dry test operation, the following steps are carried out.

Firstly, with the deluge valve closed, water is enabled to flow from the fire main though an outlet hose. The flow is choked until the pressure corresponds to the recorded back pressure of the deluge system immediately prior to the first dry test. If the flow rate from the discharge hose and the pressure condition is measured to be the same as in the initial or previous test, it can be inferred that the conditions of the fire main have not changed. This eliminates a variable that may otherwise affect subsequent tests of the deluge system itself.

The accumulator 110 is tied in to the deluge system, and a recalibrated set of sensors 130 is installed in the previously recorded nozzle locations. The dry test begins with gas being controllably discharged into the deluge system for a second test period, during which the flow and pressure measurements are taken by the sensors 130. The measurements taken by the sensors are transmitted to the central receiver 160 to generate a second test data set for subsequent processing and analysis.

Comparison of the second data set with a data set from an earlier test enables an assessment of changing conditions in the deluge system. Importantly, the invention enables the assessment of the change of conditions in the deluge system, for example the build up of scale, debris, or corrosion, without a necessity to perform a subsequent wet test.

If the comparison with the first and second data sets reveals that the data is substantially the same, all within an acceptable range of variation, it may be inferred that the deluge system condition has not changed. If a previous data set was collected at a time shortly after a successful wet test (or for some other reason was known to be in an acceptable operating condition) it is possible to infer that the deluge system is in an acceptable operating condition while avoiding repetition of the wet test. This offers significant advantages to the operators and managers of the facility. In particular, avoiding a further wet test avoids the requirement to protect or tag-off equipment in the facility; avoids exposing personnel to operation of the deluge system; minimises downtime; and avoids detrimental effects of water discharge in the facility.

A variation to the above-described embodiment, the deluge system is sub-divided before carrying out the tests. This may be necessary where the deluge system is particularly large, and/or the accumulator is not able to provide sufficient volume to adequately test the flow through the whole deluge system. This can be achieved by, for example, blinding off adjacent sections of the deluge system, for example, at the dotted line indicated by 170 in FIG. 2. Secondly, separate sections of the deluge system can be tested in subsequent testing operations.

Figure 6:
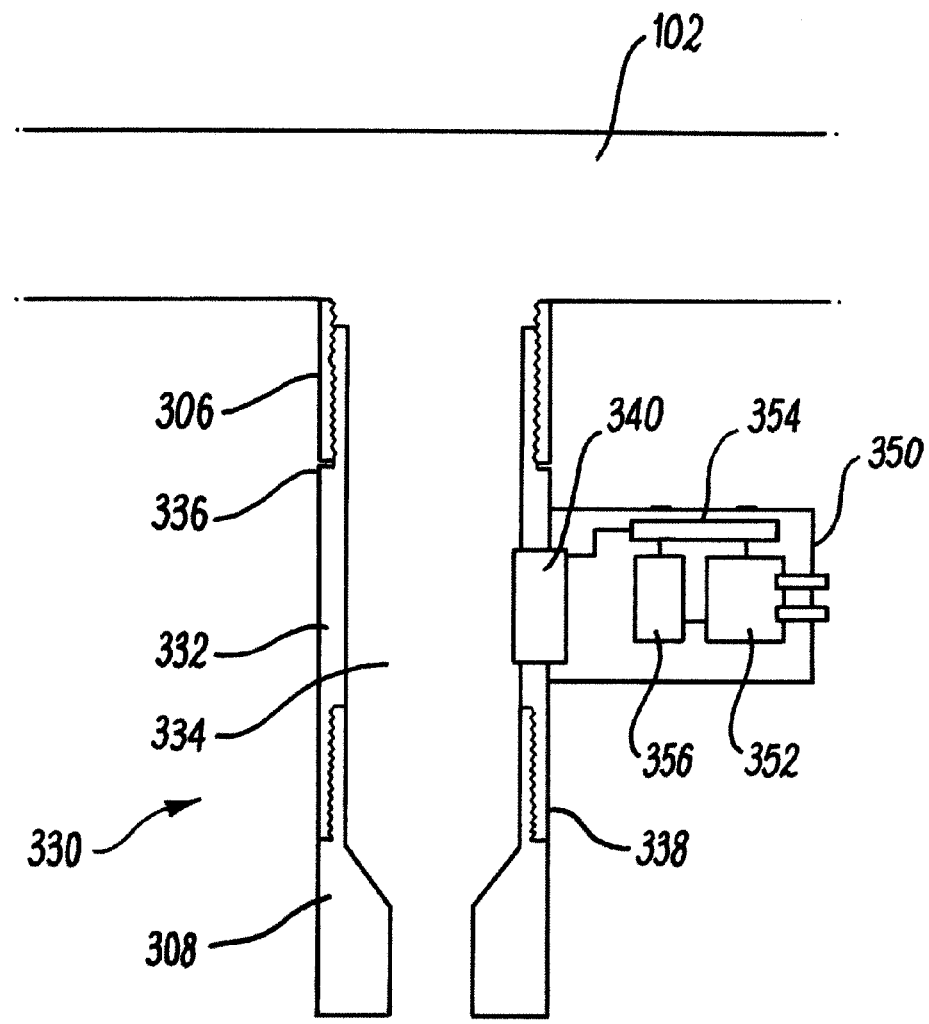
FIG. 6 is a view of a sensor according to an alternative embodiment of the invention.

The above-described embodiments use a plurality of sensors 130 which include a flow meter 138 and a pressure gauge 140. In an alternative embodiment of the invention, an alternative sensor type is used which does not include both a flow meter and a pressure gauge. An example of such a sensor is shown in FIG. 6, generally depicted at 330 installed at a nozzle attachment of a deluge system pipe 102. The sensor 330 comprises a substantially cylindrical body 332 defining a throughbore 334. A first end 336 of the body 332 is configured for threaded connection into an existing thread 306 in the pipe 102, which in normal use provides a connection point for nozzle 308. A second end 338 of the body 332 is configured for threaded connection into the nozzle 308.

Whereas the body of the nozzle 130 accommodates a flow meter 138, no flow meter is present in nozzle 330. Instead, the sensor 330 comprises a pressure gauge 340 exposed to the throughbore 334, which provides a range of measurements between about 0 and 20 bar (about 0 to 2000 kPa). The sensor 330 also comprises an electronics module 350 comprising a rechargeable battery 352, a control module 354, and a wireless communication transceiver 356. The electronics module is located at one side of the main housing 332 of the sensor 330, and has the necessary Zone 2 rating suitable for use in offshore environments.

The sensor 330 functions in the same way as the sensor 130 of the previous embodiments, and may be used with a storage and configuration module similar to the module 200 of FIG. 4. The method of use described above with respect to the previous embodiments of the invention also apply to the sensor 330: the sensors are calibrated and installed in a deluge system to provide a means of collecting fluid parameters during gas testing phases. However, in this example the sensor collects only fluid pressure data, which is stored and processed used to derive information about the condition of the deluge system.

It will be appreciated that in further alternative embodiments combinations of pressure and flow rate measurements may be collected at different locations in the deluge system.

In the methods described above an initial wet-test is performed to verify that the deluge system is performing correctly, before an initial gas or dry test to collect data which provides a benchmark for future gas or dry tests. However, in an alternative embodiment of the invention, an initial wet test is avoided by building a model of the deluge system using pipe network fluid flow analysis software such as the software package marketed by Sunrise Systems Limited under the PIPENET™ brand. The software package is configured to model the specific deluge system being tested, and calculate expected gas pressures and/or flow rates at the locations of the sensors. When a dry test is performed in accordance with the method of the invention, the pressure readings taken are compared with the modelled pressure values, and where discrepancies exist a problem with the flow system can be inferred.

The invention provides a method and apparatus for of performing a test on a deluge system. The method comprises providing a gas source in fluid communication with a deluge system. A plurality of fluid sensors is installed at a plurality of locations (e.g. nozzles) in the deluge system. The gas source is activated to cause gas to flow through the deluge system during a gas test period, and using the plurality of sensors, at least one fluid parameter during the gas test period is measured to provide a gas test data set. The first gas test data set is stored, transmitted and/or processed to derive information about the condition of the deluge system.

Various modifications to the above-described embodiments may be made within the scope of the invention, and the invention extends to combinations of features other than those expressly claimed herein.

The invention claimed is:

1. A method of performing a test on a water deluge system, the method comprising:
   providing a pressurised gas source in fluid communication with a water deluge system, the water deluge system comprising a dry side and a wet side separated by a deluge valve, the dry side of the water deluge system having a network of pipes and nozzles which are maintained in an open condition;
   providing a plurality of fluid sensors at a plurality of locations in the dry side of the water deluge system;
   activating the pressurised gas source to cause gas at higher pressure than atmospheric pressure to flow through the dry side of the water deluge system and out through the nozzles during a gas test period; and
   measuring, using the plurality of fluid sensors, at least one fluid parameter of the gas during the gas test period to provide a gas test data set.

2. The method according to claim 1 wherein said measuring at least one fluid parameter of the gas comprises measuring at least one of flow rate and pressure of the gas at the plurality of locations in the water deluge system.

3. The method according to claim 1, comprising installing the plurality of fluid sensors at the plurality of locations in the water deluge system, the plurality of locations comprising a subset of nozzle locations of the water deluge system.

4. The method according to claim 3, comprising logging or recording the subset of nozzle locations at which the plurality of fluid sensors is installed.

5. The method according to claim 1, wherein the gas test period is between approximately 5 seconds and 120 seconds.

6. The method according to claim 1, wherein the gas test period is not greater than about 30 seconds.

7. The method according to claim 1, wherein the gas test period is a first gas test period at a first time, and the gas test data set is a first gas test data set, and comprising storing the first gas data set for subsequent comparison against a further gas data set acquired at a later time.

8. The method according to claim 7, wherein the first gas test period is when the water deluge system is in a known first operational condition.

9. The method according to claim 8, wherein the first operational condition is when the water deluge system is known to be or assumed to be functioning at an acceptable level.

10. The method according to claim 7 wherein the first gas test period is subsequent to a successful wet test process.

11. The method according to claim 1, comprising performing a wet test of the water deluge system prior to the gas test period.

12. The method according to claim 10, comprising determining a parameter selected from at least one of pressure and flow rate of water in the fire main corresponding to the wet test.

13. The method according to claim 12, comprising determining a flow rate corresponding to the wet test by measuring the flow rate at the same pressure as a water pressure measured during a wet test.

14. The method according to claim 13 comprising:
   closing the deluge valve;
   flowing water from the fire main to a discharge conduit;
   choking the flow through the discharge conduit until the pressure in the fire main corresponds to the measured water pressure during the wet test;
   measuring the flow rate through the discharge conduit.

15. The method according to claim 1, comprising modelling the water deluge system using a computer-based modelling system, and calculating expected values of at least one fluid parameter at the plurality of locations.

16. The method according to claim 15, comprising comparing the calculated expected values of the at least one fluid parameter with the measured values of the at least one fluid parameter.

17. The method according to claim 1, comprising calibrating the plurality of fluid sensors prior to performance of a gas test.

18. The method according to claim 17, wherein said calibrating the plurality of fluid sensors comprises controllably discharging a gas through the plurality of fluid sensors from an auxiliary gas source.

19. The method according to claim 1, comprising wirelessly transmitting measurement data from the fluid sensors to a central receiver.

20. The method according to claim 1, wherein the gas test period is a second gas test period at a second time, and the gas test data set is a second gas test data set, and further comprising comparing the second gas test data set with a gas test data set acquired at an earlier time.

21. The method according to claim 1, comprising:
   activating the pressurised gas source to cause gas to flow through the water deluge system during a first gas test period at a first time;
   measuring, using the plurality of fluid sensors, at least one fluid parameter during the first gas test period to provide a first gas test data set;

activating the pressurised gas source to cause gas to flow through the water deluge system during second gas test period at a later, second time;

measuring, using the plurality of fluid sensors, at least one fluid parameter during the second gas test period to provide a second gas test data set; and comparing the first and second gas test data sets.

22. The method according to claim 20, wherein comparing the first and second gas test data sets comprises inferring a change or no change in condition of the water deluge system from the comparison of the gas test data sets.

23. An apparatus for performing a test on a water deluge system, the apparatus comprising:

A pressurised gas source configured to be coupled to a water deluge system, the water deluge system comprising a dry side and a wet side separated by a deluge valve, the dry side of the water deluge system having a network of pipes and nozzles which are maintained in an open condition;

a plurality of fluid sensors configured to be coupled to the water deluge system at a plurality of locations in the dry side of the water deluge system;

wherein the pressurised gas source is operable to cause gas at higher pressure than atmospheric pressure to flow through the dry side of the water deluge system and out through the nozzles during a gas test period;

and wherein the plurality of fluid sensors is operable to measure at least one fluid parameter of the gas during the gas test period to provide a gas test data set.

24. The apparatus according to claim 23, wherein the pressurised gas source is an accumulator.

25. The apparatus according to claim 23, wherein the pressurised gas source is operable to discharge gas into the water deluge system for a test period of between approximately 5 seconds and 120 seconds.

26. The apparatus according to claim 23, wherein the pressurised gas source is operable to discharge gas into the water deluge system for a test period not greater than about 30 seconds.

27. The apparatus according to claim 23, wherein each of the plurality of fluid sensors comprises: a body having a throughbore and a connector configured to enagble the sensor to be coupled to a nozzle of the water deluge system; at least one of a flow meter and a pressure gauge disposed in the throughbore; an electronic module configured to receive a signal from the at least one of the flow meter or pressure gauge, and configured to store and/or transmit data corresponding to the received signals.

28. A method of monitoring a water deluge system, the method comprising:

providing a pressurised gas source in fluid communication with a water deluge system, the water deluge system comprising a dry side and a wet side separated by a deluge valve, the dry side of the water deluge system having a network of pipes and nozzles which are maintained in an open condition;

providing a plurality of fluid sensors at a plurality of locations in the water deluge system;

activating the pressurised gas source to cause gas at higher pressure than atmospheric pressure to flow through the water deluge system during a first gas test period at a first time;

measuring, using the plurality of fluid sensors, at least one fluid parameter of the gas during the first gas test period to provide a first gas test data set;

activating the pressurised gas source to cause gas at higher pressure than atmospheric pressure to flow through the water deluge system during a second gas test period at a later, second time;

measuring, using the plurality of fluid sensors, at least one fluid parameter of the gas during the second gas test period to provide a second gas test data set; and comparing the first and second gas test data sets.

29. A method of monitoring a water deluge system, the method comprising:

providing a pressurised gas source in fluid communication with a water deluge system, the water deluge system comprising a dry side and a wet side separated by a deluge valve, the dry side of the water deluge system having a network of pipes and nozzles which are maintained in an open condition;

providing a plurality of fluid sensors at a plurality of locations in the water deluge system;

providing a model of the water deluge system using a computer-based modelling system, and calculating expected values of at least one fluid parameter at the plurality of locations according to the model;

activating the pressurised gas source to cause gas at higher pressure than atmospheric pressure to flow through the water deluge system during a first gas test period at a first time;

measuring, using the plurality of fluid sensors, at least one fluid parameter of the gas during the first gas test period to provide a first gas test data set;

comparing the calculated expected values of the at least one fluid parameter of the gas with the measured values of the at least one fluid parameter of gas.

30. The method according to claim 1, comprising storing, transmitting and/or processing the gas test data set to derive information about the condition of the water deluge system.

* * * * *